LOGICAL DECISION CIRCUITRY FOR DIGITAL COMPUTATION

Filed Nov. 18, 1955 4 Sheets-Sheet 1

WITNESSED BY

Gene W. Arant

DANIEL L. CURTIS,
INVENTOR

BY Henry Heyman
ATTORNEY

Sept. 8, 1959 D. L. CURTIS 2,903,606

LOGICAL DECISION CIRCUITRY FOR DIGITAL COMPUTATION

Filed Nov. 18, 1955 4 Sheets-Sheet 2

DANIEL L. CURTIS,
INVENTOR

BY Henry Heyman
ATTORNEY

Sept. 8, 1959 D. L. CURTIS 2,903,606

LOGICAL DECISION CIRCUITRY FOR DIGITAL COMPUTATION

Filed Nov. 18, 1955 4 Sheets-Sheet 3

DANIEL L. CURTIS,
INVENTOR

BY Henry Heyman
ATTORNEY

Sept. 8, 1959 D. L. CURTIS 2,903,606

LOGICAL DECISION CIRCUITRY FOR DIGITAL COMPUTATION

Filed Nov. 18, 1955 4 Sheets-Sheet 4

DANIEL L. CURTIS,
INVENTOR

BY Henry Heyman
ATTORNEY 2,903,606

LOGICAL DECISION CIRCUITRY FOR DIGITAL COMPUTATION

Daniel L. Curtis, Manhattan Beach, Calif., assignor to Hughes Aircraft Company, Culver City, Calif., a corporation of Delaware Application November 18, 1955, Serial No. 547,830

4 Claims. (Cl. 307—88.5)

This invention relates to logical decision circuitry especially suitable for digital computation, and more particularly to flip-flop circuits and electrical gating circuits associated therewith.

It is well known in the computing art to employ flip-flops or other bistable devices in combination with electrical gating circuits. In such combinations the function of the flip-flops is to store bi-valued signals, each of which represents a binary digit of information, while the function of the gating circuits is to form from the previously available signals new electrical signals which represent new information or intelligence.

The most commonly used flip-flops or bistable devices are those of the Eccles-Jordan type utilizing a pair of cross-coupled vacuum tubes and having two states of static stability. The triggering of such a circuit from one of its states to the other normally requires an input voltage pulse having an amplitude of at least seven volts and having sufficient time duration and energy content to overcome the tendency of the circuit to remain in its existing state. Trigger input pulses of this character must, therefore, be provided by the associated electrical gating circuits.

Two accepted methods of gating involve the use of different types of electrical signals to represent the binary digits. According to one method the value of a binary digit is represented either by the presence or absence of a pulse. Gating circuits suitable for logically combining pulse signals of this type are described, for example, in an article entitled "Diode Coincidence and Mixing Circuits in Digital Computers," by Tung Chang Chen, at pages 511 to 514 inclusive of the "Proceedings of the IRE," May 1950. According to a second method of gating each binary digit is represented by a voltage signal which occupies either a relatively high level or a relatively low level. The output signal of a gating matrix, representing the logical combination of all the input signals, is then periodically sampled by a clock or read-out pulse in order to provide output pulses which may be utilized to trigger a flip-flop which is to be controlled by the matrix. Circuits of this type are described, for example, in U.S. Patent No. 2,644,887 for "Synchronizing Generator," issued July 7, 1953, to A. E. Wolfe, Jr.

Regardless of whether the pulse method or the voltage-level method of gating is employed, however, the mechanization of a gating circuit presents severe engineering requirements. Pull-up and pull-down resistors drawing substantial biasing currents must be supplied with bias voltages of the order of 100 to 200 volts. In large computer systems including hundreds of flip-flops and gates, the driving power which is required may be many kilowatts of electrical energy despite the fact that the function of the system is merely the storage and generation of intelligence signals. Not only does the large power consumption of such a system require an equivalent large, well-regulated power supply, but the computation circuitry itself must be adequately spaced to prevent over-heating, and may very possibly have to be provided with auxiliary cooling equipment.

In the prior art it is known to use flip-flop circuits of the type including a pair of cross-coupled transistors, in lieu of vacuum tubes. In this manner the requirements for the amplitude of input trigger pulses have been diminished somewhat, but the basic problems have remained essentially the same.

Additional difficulties are presented by gating circuits of the prior art. Transmission through the gating circuit of voltage pulses, or changes in voltage level, of the order of 10 to 20 volts requires considerable time because of the necessity of charging the stray capacitance associated with the circuit. This results in a definite limitation on the operating speeds of such circuits. Furthermore, gating elements such as semiconductor diodes which are frequently used in such circuits, are subject to rather severe requirements as to their characteristics.

Available prior art circuitry has also imposed a limitation on the logical design of computer systems inasmuch as it has been possible for one flip-flop to drive only a limited number of gating circuits. Thus, where it is desired to use a particular binary digit in a large number of mathematical operations, either the digit must be simultaneously stored in several flip-flops or else the operations must be performed in time sequence.

Accordingly, an object of the present invention is to provide combinations of flip-flops and gating circuits which require very little driving power.

Another object of the invention is to obviate the hitherto existing limitation upon the operating speed of computing circuits on account of the necessity of charging stray circuit capacitance.

A further object of the invention is to provide a diode gating circuit in which the requirements for the diode characteristics are substantially less severe than in the prior art.

A still further object of the invention is to provide flip-flop and gating circuit combinations in which each flip-flop is capable of driving of the order of 300 different gating circuits.

Yet a further object of the invention is to provide an electrical gating circuit for selectively triggering a transistor flip-flop by means of current pulse output signals having very small voltage changes associated therewith.

Still another object of the invention is to provide novel circuits for gating, and for combining with a read-out pulse, low energy output signals of the type produced by dynamic transformer-coupled flip-flops.

According to the present invention there are provided novel circuit combinations, each including a transformer-coupled transistor flip-flop, a diode gating circuit, and means for applying a sampling or read-out pulse thereto.

The transistor flip-flop contemplated by the present invention is fully described and claimed in a copending application entitled "Transistor Multivibrator" by Daniel L. Curtis, Serial No. 547,829, filed concurrently herewith and assigned to the assignee of the present application. This type of flip-flop circuit produces voltage-couple signals which may be sampled at the end of each time interval, in the same manner as voltage-level signals. The term "voltage-couple" is used in keeping with the terminology of U.S. Patent No. 2,609,143 for "Electronic Computer for Addition and Subtraction," issued September 2, 1952, to George R. Stibitz.

The present invention recognizes that a flip-flop circuit utilizing junction transistors may be triggered by applying a predetermined amount of current for a predetermined period of time, and that therefore the controlling gating circuit need not provide more than a nominal voltage change. Gating circuits according to the present invention utilize conventional diode gating elements but operate on voltage changes of the order of only 2 volts.

An additional feature of the present invention is that the sampling or clock pulse, rather than being applied at the output of a gating circuit, is applied at each input by means of a connection to the center tap of the secondary winding of the output transformer of the flip-flop which provides the input signal. Flip-flops and gating circuits may be combined in accordance with the present invention to provide any desired logical operation. Steering signals from the output of a flip-flop may, if desired, be incorporated into the gating circuits which control the flip-flop. As many as ten or more successive levels or stages of gating may be employed without circuit redesign or the danger of unreliable operation.

The novel features which are believed to be characteristic of the invention, both as to its organization and method of operation, together with further objects and advantages thereof, will be better understood from the following description considered in connection with the accompanying drawings in which the invention is illustrated by way of example. It is to be expressly understood, however, that the drawings are for the purpose of illustration and description only, and are not intended as a definition of the limits of the invention.

Figure 1:
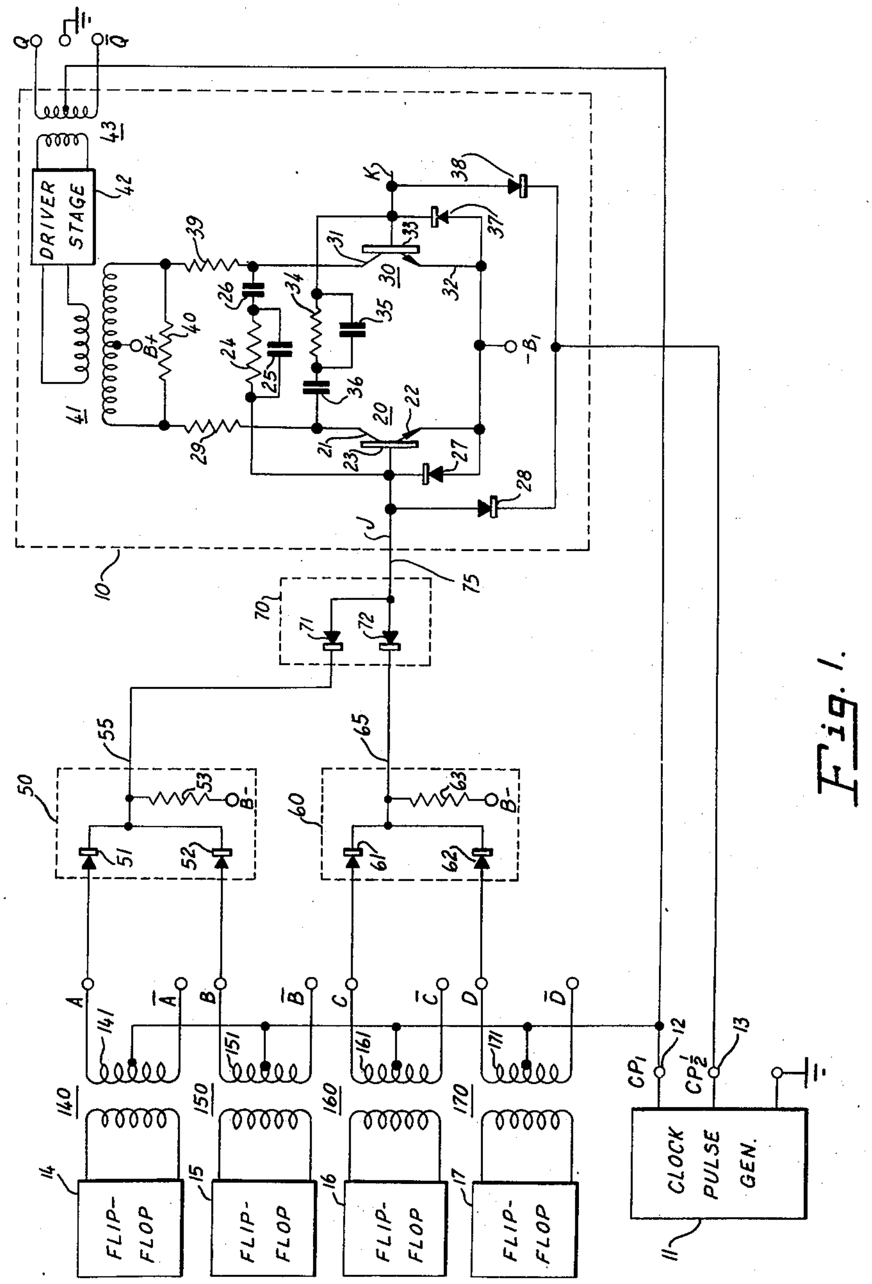
Fig. 1 is a schematic circuit diagram, partially in block form, illustrating in accordance with the present invention a transformer-coupled transistor flip-flop, a gating matrix selectively providing input signals to control the flip-flop, a plurality of sources of input signals for driving the gating matrix, and a clock pulse generator for providing a sampling or clock pulse.

Referring now to the drawings and, more particularly, to Fig. 1, there is shown a transformer-coupled transistor flip-flop 10 including a driver stage 42.

The flip-flop is controlled by clock-pulse generator 11 in accordance with logical signals developed within gating circuits 50, 60, and 70. Input information for the gating circuits is supplied by signals from flip-flops 14, 15, 16, and 17, shown only in block form. Generator 11 supplies a delayed clock pulse $CP_{\frac{1}{2}}$ via lead 13 to input leads J and K of flip-flop 10, for triggering the flip-flop during the middle of each clock period. A primary clock pulse $CP_1$ is also supplied via lead 12 to the gating circuits for sampling an output signal developed thereby, the sampled output signal being applied from gating circuit 70 to input lead J for selectively triggering flip-flop 10 at the ends of the clock period.

The circuit structure and the response characteristics of flip-flop 10 will first be explained in some detail.

Flip-flop 10 includes a pair of transistors 20 and 30 illustrated as being of the N–P–N junction type as indicated by the conventional schematic symbol. Transistor 20 has a collector 21, an emitter 22, and a base 23; and transistor 30 has a collector 31, an emitter 32, and a base 33; both of the emitters being connected to a negative power supply terminal $-B_1$. A first cross-coupling network includes a resistor 24 and a capacitor 25 connected in parallel, one end of the combination being connected to base 23, the other end being connected through a capacitor 26 to collector 31. In this cross-coupling network the series capacitor 26 functions as a blocking capacitor and has a much larger capacitance than the shunt capacitor 25, in order to provide a substantially constant current characteristic. A second cross-coupling network includes a resistor 34 and a capacitor 35 connected in parallel, the combination being connected to base 33, and connected serially through a capacitor 36 to collector 21. A similar selection of values is made in the second cross-coupling network.

The transistors are energized from a source of positive voltage through a terminal B+ connected to a center tap of the primary winding of a transformer 41, one end of the primary winding being connected through a resistor 29 to collector 21 and the other end through a resistor 39 to collector 31. A resistor 40 is connected across the primary winding of the transformer in order to prevent ringing, or undesired oscillations. A semiconductor diode 27 has its cathode connected to base 23 and its anode to terminal $-B_1$, while another diode 37 has its cathode connected to base 33 and and its anode to $-B_1$.

Thus there is provided an astable circuit, energized by a source of power connected between terminals B+ and $-B_1$. The circuit has one condition of stability corresponding to transistor 20 being "on" and transistor 30 being "off," and another condition of stability corresponding to the opposite situation when transistor 30 conducts and transistor 20 does not. Each cross-coupling network provides a substantially constant current which flows in one direction when its associated transistor is conducting and in the opposite direction when its transistor is cut off. The astable operation will be explained on the assumption that no triggering pulses are applied and that diodes 28, 38, 71, and 72 are back-biased.

When transistor 20 conducts, current in the conventional sense flows from B+ through resistor 29, collector 21, emitter 22 and hence to $-B_1$, thus biasing collector 21 at a relatively low voltage level. Meanwhile transistor 30 is non-conducting and collector 31 is biased at a high level. Current therefore flows out of capacitor 26 through resistor 24, base 23, and emitter 22 to $-B_1$, thus biasing base 23 a fraction of a volt positive with respect to emitter 22 and back-biasing diode 27 to the same extent.

When transistor 30 conducts, collector 21 is biased at a high level, current flows through resistor 24 to re-charge capacitor 26, hence this current flows from $-B_1$ through diode 27 to resistor 24. Diode 27 is then biased in the forward direction by a fraction of a volt, and the base-to-emitter path is back-biased to the same extent. Thus, when transistor 20 is conducting capacitor 36 charges and capacitor 26 discharges, while when transistor 30 is conducting the opposite situation exists. The circuit triggers itself when the current from the discharging capacitor is no longer adequate to bias the base of the conducting transistor at a level corresponding to increased collector voltage resulting from charging of the other capacitor. Flip-flop 10 also includes a driver stage 42 which is coupled to the secondary winding of transformer 41, and an output transformer 43 which is coupled to the output of the driver stage. Driver stage 42 may, for example, include a pair of transistors connected essentially in push-pull. The secondary winding of output transformer 43 is provided with a center-tap, connected to an output terminal of clock-pulse generator 11, as will be explained hereinafter.

Flip-flop 10 also includes, as a trigger input circuit, diodes 28 and 38 having their anodes connected to bases 23 and 33, respectively, and their cathodes connected in common to output lead 13 of clock pulse generator 11. Trigger leads connected to bases 23 and 33 are labelled as J and K, respectively. It is not necessary to describe the structure and operation of flip-flop 10 in detail herein as it is fully described and claimed in the aforementioned copending Curtis application.

Figure 2:
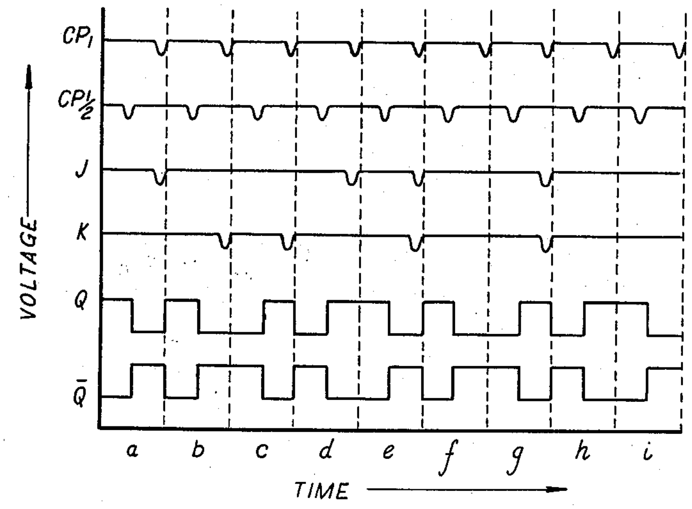
Fig. 2 is a graph of waveforms illustrating the response characteristic of the controlled flip-flop in the circuit of Fig. 1.

Reference is made to Fig. 2 illustrating voltage waveforms plotted with respect to time and descriptive of the response characteristic of flip-flop 10 to input signals applied thereto. $CP_1$ corresponds to a clock pulse, and $CP_{\frac{1}{2}}$ to a delayed clock pulse, both of which may be provided by generator 11 of Fig. 1. $CP_{\frac{1}{2}}$ is applied through diodes 28 and 38 to trigger the flip-flop during the middle of each time interval *a*, *b* . . . *i* of Fig. 2. Waveforms $\bar{J}$ and $\bar{K}$ illustrate the selective application of $CP_1$ to the trigger input leads J and K at the ends of the time intervals. Waveforms Q and $\bar{Q}$ illustrate the output signals which result.

It will be noted that the labelling of the input leads J and K, and the output terminals Q and $\bar{Q}$, is essentially arbitrary, that is, either input lead could be labelled J and the other input lead would then be called K. Likewise, either output terminal could be labelled Q and the other output terminal would then become $\bar{Q}$. It is then apparent that for a given labelling of the input leads there exist two possible selections of labels for the output terminals. In order to avoid any ambiguity from this situation, the definition is established herein that the J input lead is the one which, when pulsed while the Q output terminal is at a low voltage level, will cause the circuit to trigger so that the Q output terminal assumes a high voltage level. This definition can be readily confirmed from Fig. 2. It then follows that the K input lead is the one which, when pulsed while the Q output terminal is at a high voltage level, causes the circuit to trigger so that the Q output terminal assumes a low voltage level.

Having thus established the labelling of the input and output terminals of the flip-flop, it now becomes possible to analyze the logical operation of the circuit. In general, the state of the flip-flop during a particular time interval is a function of three variables; its state during the immediately preceding time interval; and the J and K input signals applied at the end of the immediately preceding time interval. These three binary variables give rise to eight possible types of response. It will be noted that all eight possibilities are graphically illustrated in Fig. 2.

Although not necessary to a description of the present invention, it may be pointed out that in the design of computer logical circuitry it is often convenient to employ a mathematical formula to describe the operation of the flip-flop. For this purpose it is necessary to select a binary convention for the input signals: that is, a binary 1 is represented by a pulse and a binary 0 by no pulse, or vice versa. It is also necessary to establish a convention for the output signals, that is, a high voltage level at the end of a time interval represents a binary 1 and a low level binary 0, or vice versa. There are therefore a total of four possibilities as to how the binary conventions for input and output signals may be selected, and the equation describing the logical response characteristic of the flip-flop assumes a different form for each one of these possibilities.

Table I below sets forth, for each possible selection of the binary convention, the corresponding form of the general equation describing the logical response characteristic of the flip-flop. It may be noted that the logical response characteristic of flip-flop 10 of this application, which is fully described and claimed in the aforementioned Curtis application is the same as the logical response characteristic of the transformer-coupled vacuum-tube flip-flop described and claimed in the copending application of Daniel L. Curtis, Serial No. 474,527 for "Flip-Flop for Generating Voltage-Couple Signals," filed December 10, 1954, and assigned to the same assignee as this application. Further, Table I of this application is an exact copy of Table III of said application No. 474,527.

*Table I*

| Rule | Input signal=binary 1 for— | Q=1 when level at end of interval is— | Generalized equation |
|---|---|---|---|
| 1 | Pulse | High | $Q_n=\bar{J}_{n-1}.\bar{Q}_{n-1}+K_{n-1}.Q_{n-1}$. |
| 2 | do | Low | $Q_n=J_{n-1}.Q_{n-1}+\bar{K}_{n-1}.\bar{Q}_{n-1}$. |
| 3 | No pulse | High | $Q_n=J_{n-1}.\bar{Q}_{n-1}+\bar{K}_{n-1}.Q_{n-1}$. |
| 4 | do | Low | $Q_n=\bar{J}_{n-1}.Q_{n-1}+K_{n-1}.\bar{Q}_{n-1}$. |

In the generalized equations in Table I the symbol $Q_n$ represents the state of the flip-flop during a present time interval $n$ and $Q_{n-1}$ represents the state of the flip-flop during the preceding time interval $(n-1)$. Symbol $\bar{Q}_{n-1}$ represents the binary complement of $Q_{n-1}$. Symbols $J_{n-1}$ and $\bar{J}_{n-1}$ respectively represent the J input signal, and its binary complement, during time interval $(n-1)$. In a similar manner symbols $K_{n-1}$ and $\bar{K}_{n-1}$ represent the K input signal, and its binary complement, during the preceding time interval. The dot (.) represents the Boolean "and" function and the plus (+) represents the Boolean non-exclusive "or" function.

Having thus described the structure and operation of flip-flop 10, attention will now be directed to the gating matrix of Fig. 1 and the sources providing input signals thereto.

Gating circuits 50 and 60, indicated by dotted lines, receive input signals from flip-flops 14–17 and in turn drive gating circuit 70 which provides an input signal at input lead J of flip-flop 10. Sampling of the signals in the gating circuits is provided by the primary clock pulse $CP_1$ generated at output lead 12 of generator 11, and occurring once during each time interval.

Each of flip-flops 14–17 is assumed to generate voltage-couple signals of the type previously described. Therefore, these flip-flops are respectively equipped with output transformers 140, 150, 160, 170, having secondary windings 141, 151, 161, 171. Each secondary winding has upper and lower terminals for delivering primary and complementary output signals, respectively. The primary and complementary output signals of flip-flop 14 are indicated by reference characters A and $\bar{A}$, respectively, while those of the other flip-flops are indicated as B and $\bar{B}$, C and $\bar{C}$, and D and $\bar{D}$, respectively. Each secondary winding also includes a center tap to which output lead 12 of clock pulse generator 11 is connected to supply the primary clock pulses.

It is assumed that the output impedance of each flip-flop and the leakage inductance of the secondary winding are both very small compared to the output impedance of the clock pulse generator. Therefore, each output signal such as A and $\bar{A}$ effectively provides an algebraic summation of the primary clock pulse $CP_1$ and the voltage-couple signal. It will be apparent to those skilled in the art that this method of inserting the clock pulse results in a considerable reduction in the number of diodes required in the gating circuits.

Gating circuit 50 includes diodes 51 and 52 having their anodes connected to the primary output terminals of flip-flops 14 and 15 to receive signals A and B, respectively. The cathodes of diodes 51 and 52 are connected to a lead 55 upon which the output signal of gating circuit 50 appears. A pull-down resistor 53 is connected between lead 55 and a negative biasing source B—.

Gating circuit 60 includes diodes 61 and 62 having their anodes connected to the primary output terminals of flip-flops 16 and 17 for receiving input signals C and D, respectively. The cathodes of diodes 61 and 62 are connected to an output lead 65. A pull-down resistor 63 is connected between lead 65 and B—.

Gating circuit 70 includes a diode 71 having its cathode connected to lead 55 and a diode 72 having its cathode connected to lead 65. The anode terminals of diodes 71 and 72 are connected by means of lead 75 to input lead J of flip-flop 10.

Having thus described the structure of the gating matrix of Fig. 1, its functional operation will be explained in connection with Fig. 3 to which reference is now made for that purpose.

Figure 3:
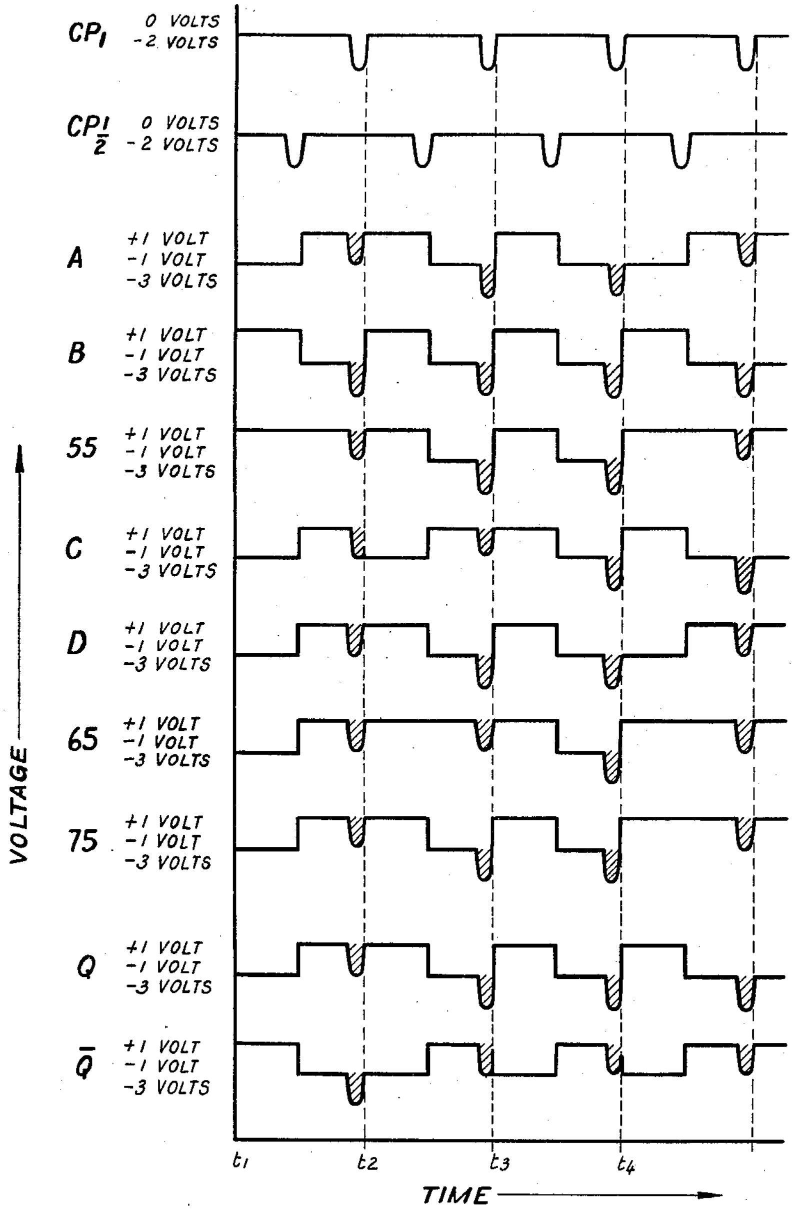
Fig. 3 is a graph of waveforms illustrating the operation of the electrical gating matrix of Fig. 1.

In Fig. 3 are illustrated various voltage waveforms plotted with respect to time occurring in the circuit of Fig. 1, under certain assumed input signal conditions. For purposes of illustration four successive clock pulse intervals $t_1$, $t_2$, $t_3$, $t_4$ are shown. On the top lines of the graph the occurrences of the primary clock pulse $CP_1$ and the delayed clock pulse $CP_{1/2}$ as a function of time are illustrated. It will be noted there that $CP_1$ occurs at the end of each time interval, and that $CP_{1/2}$ occurs approximately during the middle of each time interval. Both clock pulses are illustrated as having a negative excursion from a reference level of 0 volts to a maximum amplitude of −2 volts. It will of course be understood that these values are only illustrative.

Waveforms A and B represent the primary output signals of flip-flops 14 and 15 which are applied to gating circuit 50, while waveform 55 represents the output signal appearing at output lead 55 of gating circuit 50. In each of these waves the cross hatching is used to indicate the portion of the wave due to the occurrence of clock pulse $CP_1$ . It will be noted from these waveforms that the flip-flop output voltages are assumed to have a high level of +1 volt or a low level of −1 volt. The inclusion of the clock pulse provides a maximum excursion to −3 volts of the output signals obtained from the transformer secondaries of the flip-flops 14, 15, 16, 17, depending upon the level of the voltage-couple signal at the time of the occurrence of the clock pulse. Thus, signal A is at the high level during the latter portion of time interval $t_1$, and the occurrence of the clock pulse temporarily brings the voltage down to −1 volt. During the latter portion of the time interval $t_2$, however, signal A is at its lower level, and the occurrence of the clock pulse therefore temporarily brings the voltage down to −3 volts.

The action of gating circuit 50 will first be explained from the waveforms of Fig. 3, and then will be traced in connection with the actual circuit structure. From Fig. 3 it is apparent that waveform 55 always corresponds to the higher of either A or B. Thus, upon occurrence of the clock pulse, waveform 55 reaches the level of −3 volts only if both A and B reach the level of −3 volts. In Fig. 1 it may be assumed that B− has a value of −30 volts. Therefore, current in the conventional sense normally flows from the secondary windings of flip-flops A and B through diodes 51 and 52, respectively, hence through pull-down resistor 53 to the source B−, and back through the ground return of clock pulse generator 11.

The voltage level at output terminal 55 is a function of the voltage levels A and B applied to the anodes of diodes 51 and 52. If either anode is biased at the upper level of +1 volt, for example, then output terminal 55 will be biased at the same level; if, at the same time, the other anode is biased at the lower voltage level of −1 volt, then the other diode will become back-biased. From this brief analysis it is apparent that both diodes conduct when A and B are at the same level, that when one input level is lower than the other input level the associated diode becomes back-biased, and that the voltage level of output terminal 55 is controlled by the higher of the two input levels.

Fig. 3 further includes waveforms C and D representing the output signals from flip-flops 16 and 17, and a waveform 65 representing the output signal generated by gating circuit 60. The operation of gating circuit 60 is substantially the same as that of gating circuit 50 and hence requires no further explanation. Both the output waveform 55 of gating circuit 50 and the output waveform 65 of gating circuit 60 are applied to the succeeding gating circuit 70.

It will be noted from Fig. 1 that diodes 71 and 72 in gating circuit 70 are connected with reverse polarity as compared to diodes 51, 52 and 61, 62. Gating circuit 70, therefore, has the opposite function of that of the other gating circuits, namely, its output signal corresponds to the lower of the two input signal levels.

It would appear that gating circuit 70 should include a pull-up resistor connected to output lead 75. The equivalent function is performed, however, by the cross-coupling network in flip-flop 10 including resistor 24 and capacitors 25, 26, as will be explained hereinafter. Not only is a pull-up resistor unnecessary to the proper operation of gating circuit 70, but it would actually interfere with the proper astable operation of flip-flop 10 inasmuch as it would be directly connected to the J input lead thereof.

Gating circuit 70 develops an output signal which corresponds to the lower of the two input signal levels, and operates to apply the primary clock pulse $CP_1$ to the J input lead of flip-flop 10 whenever the output signal on lead 75 is at the lower level. This operation is accomplished by establishing the potential level $-B_1$ in flip-flop circuit 10 at a point intermediate the lower voltage signal level of −1 volt, and the maximum negative clock pulse excursion of −3 volts, as will be explained subsequently.

In the preceding discussion no particular binary convention has been selected for the input and output signals of flip-flops 14 to 17 and of the controlled flip-flop 10, nor has any name been attached to the logical operation of gating circuits 50, 60, and 70. The logical interpretation of the operation of the gating circuits depends upon the binary convention which is attached to the flip-flop input and output signals. Thus gating circuits 50 and 60 become "not or" circuits according to rule 1 of Table I; "and" circuits according to rule 2 of Table I; "or" circuits according to rule 3 of Table I; and "not and" circuits according to rule 4 of Table I. In a similar manner gating circuit 70 provides the function "not and," "or," "and," and "not or," in accordance with rules 1, 2, 3, and 4, respectively, of Table I. The above logical functions are identified in Table II below.

*Table II*

| Input signals | | Output signal | | | |
|---|---|---|---|---|---|
| | | "And" | "Not and" | "Or" | "Not or" |
| 0 | 0 | 0 | 1 | 0 | 1 |
| 0 | 1 | 0 | 1 | 1 | 0 |
| 1 | 0 | 0 | 1 | 1 | 0 |
| 1 | 1 | 1 | 0 | 1 | 0 |

Although the primary purpose of Fig. 3 is to illustrate the mode of operation of gating circuits 50, 60 and 70, the output waveforms Q and $\bar{Q}$ of flip-flop 10 have also been included for the sake of completeness. It is arbitrarily assumed that signal Q is at the higher voltage level during the terminal portion of the time interval $t_1$. As shown by waveform 75 no clock pulse is applied to terminal J at the end of $t_1$. Therefore, signal Q is again at its high level during the early portion of time interval $t_2$, being returned to its lower level during the latter portion of $t_2$ in response to the delayed clock pulse $CP_{1/2}$. The circuit of Fig. 1 includes no gating circuit for supplying an input signal to input lead K, hence no pulses at all are applied to lead K except the clock pulses $CP_{1/2}$. The operation of the flip-flop during time intervals $t_1$ and $t_2$ of Fig. 3 therefore corresponds to the operation shown in time intervals $h$ and $i$ of Fig. 2.

Upon the application of a clock pulse to the J input lead in the latter portion of time interval $t_2$ the output signal Q is triggered from its low level so that it assumes its high level during the early portion of time interval $t_3$. This is illustrated in Fig. 3, and corresponds to the type of operation shown in time intervals $a$ and $b$ of Fig. 2. A similar response of the flip-flop occurs at the end of time interval $t_3$.

The proper triggering action of flip-flop 10 is dependent upon the selection of appropriate biasing voltages. In the preceding discussion it has been assumed that the voltage-couple signals existing in the gating matrix had either an upper voltage level of +1 volt or a lower voltage level of −1 volt, and that the clock pulse is passed by the output waveform 75 making a temporary excursion to the −3 volts level. In order to successfully pass the clock pulse into flip-flop 10 under these conditions, it is necessary that bias potential $-B_1$ lie somewhere between $-1$ volt and $-3$ volts. When transistor 20 is conducting the potential of base 23 is positive with respect to that of emitter 22 by a small fraction of a volt, for example, 0.1 volt. When the voltage waveforms 55 and 65 in the gating matrix are both at $+1$ volt, the incidence of the clock pulse produces a level of $-1$ volt, therefore, diodes 71 and 72 remain back-biased and the operation of flip-flop 10 is not affected by the gating matrix.

Thus a satisfactory value for bias potential $-B_1$ may be $-1.5$ volts in keeping with the other bias voltage values previously assumed. This permits diodes 71 and 72 to be back-biased by approximately 0.4 volt when the voltage-couple signals applied thereto are at their upper level and the clock pulse occurs, and at the same time permits an effective clock pulse of 1.5 volts to be applied to the J input lead when the clock pulse $CP_1$ coincides with the lower level of one of signals 55 and 65. So far as circuit action is concerned, there is no significant difference between the triggering accomplished by a delayed clock pulse $CP_{1/2}$ which passes through diode 28 to the J input lead, and a clock pulse $CP_1$ which passes through diode 71 or 72 to the J input lead. The first cross-coupling network 24, 25, 26 which connects base 23 with collector 31 has three significant phases of operation: when transistor 20 is conducting; when transistor 20 is not conducting; and when a clock pulse $CP_1$ or $CP_{1/2}$ is being applied to the base 23 for triggering transistor 20 from conducting to non-conducting. As previously mentioned, when transistor 20 is conducting the cross-coupling network 24–26 supplies the base-to-emitter current. When transistor 20 is not conducting the base 23 is biased negatively with respect to biasing source $-B_1$, and conventional current flows from $-B_1$ through diode 27 and resistor 24 into capacitor 26. The flow of current during triggering action will now be considered.

When transistor 20 is conducting and is to be triggered to the non-conducting condition, current in the conventional sense flows out of capacitor 26 through resistor 24, into base 23 and thence through emitter 22 to the biasing source $-B_1$. The application of a negative clock pulse to base 23 also means that conventional current will flow either through diode 28 to the clock pulse generator 11 (for triggering by $CP_{1/2}$), or through diode 71 or 72 to the B— source (for triggering by clock pulse $CP_1$). Thus during time $t_2$ as shown in Fig. 3, upon the incidence of clock pulse $CP_1$ waveform 65 occupies the $-1$ volt level whereas waveform 55 falls to the $-3$ volt level. The potential of base 23 which was previously at an assumed value of $-1.4$ volts is then dragged down toward the $-3$ volt level because of conventional current flowing from base 23 through diode 71 and pull-down resistor 53 to the B— source. Upon the completion of the regenerative switching action of the flip-flop circuit, current flows from $-B_1$ through diode 27, hence base 23 tends to assume a potential which is very slightly below $-B_1$, for example, 0.1 volt below $-B_1$, or a potential of $-1.6$ volts. Conventional current will continue to flow from the J lead to pull-down resistor 53, unless the clock pulse is already dissipated. The application of a triggering pulse need not continue for the full period of the regenerative switching action, but only for approximately a microsecond to insure that the regenerative action will continue and complete itself. With proper circuit design the clock pulse will generally be dissipated before switching is completed. In that case, upon completion of the switching action the gating diodes 28, 71, and 72 will all be back-biased and conventional current will flow from $-B_1$ through diode 27 to the first cross-coupling network 24–26.

It is thus apparent from the preceding discussion that the cross-coupling network 24–26 provides the biasing current for gating circuit 70 during the application of a clock pulse $CP_1$ to the J lead. Diode 27 is selected to have substantially the same forward impedance as the base-to-emitter-impedance of transistor 20, hence the cross-coupling network 24–26 sees a substantially constant impedance at base 23 at all times except during the application of a clock pulse thereto.

Figure 4:
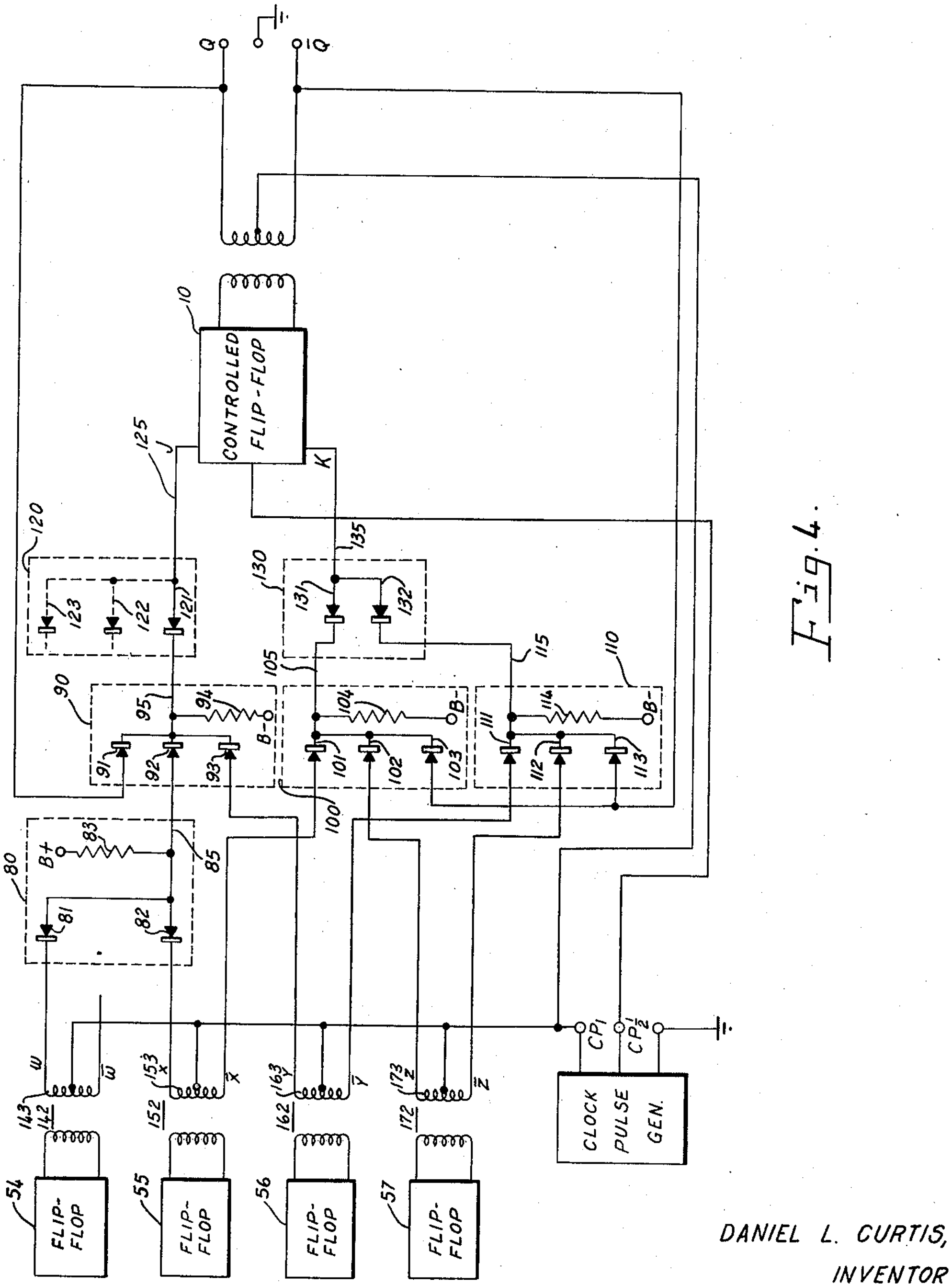
Fig. 4 is a schematic circuit diagram, partly in block form, of a system similar to that shown in Fig. 1, but including a different arrangement of the gating matrix.

Having thus described one embodiment of the digital computation circuitry according to the present invention, reference is now made to Fig. 4 wherein additional features of this type of circuitry are illustrated.

Briefly, Fig. 4 illustrates the use o more than two gating stages or levels; the use of steering signals from the output of the controlled flip-flop 10 back to the gating circuits controlling its input; limitations on the manner of connecting a gating matrix to the J or K input of the flip-flop 10; and further illustrates the more general case where both J and K inputs are separately controlled by means of separate gating matrices.

Thus in Fig. 4 a bank of flip-flops 54–57 are supplying corresponding pairs of voltage-couple output signals W and $\bar{W}$, X and $\bar{X}$, Y and $\bar{Y}$, Z and $\bar{Z}$ from which flip-flop 10 is to be controlled. Flip-flop 10 is assumed to be a transformer-coupled transistor flip-flop, preferably of the type shown in detail in Fig. 1. The J input of flip-flop 10 is controlled by a first gating matrix consisting of gating circuits 80, 90, and 120 connected in cascade, while the K input is controlled by a second gating matrix including gating circuits 100, 110 and 130.

For controlling the J input, gating circuit 80 receives signals W and X at the cathodes of diodes 81 and 82, respectively, the anodes being connected in common to one end of a pull-up resistor 83, the other end of which is connected to B+. The output lead of gating circuit 80 is designated 85. The B+ potential may be, for example, 30 volts.

Gating circuit 90 includes a diode 91 having its anode connected to the primary output Q of flip-flop 10, a diode 92 having its anode connected to lead 85 in gating circuit 80, and a diode 93 having its anode connected to receive the primary output signal Y from flip-flop 56. The cathodes of the diodes 91, 92, and 93 are connected in common to a pull-down resistor 94, the other end of which is connected to B—. The output lead of gating circuit 90 is labelled 95.

Gating circuit 120 includes a diode 121 having its cathode connected to output lead 95 of gating circuit 90 and its anode connected to the J input lead of the controlled flip-flop. Gating circuit 120 may, if desired, include additional diodes such as 122, 123, shown in dotted lines, each receiving a signal from some additional source at its cathode and having its anode tied to the anode of diode 121.

For controlling the K input, gating circuit 100 receives at the anodes of diodes 101, 102, and 103, signals $\bar{X}$, Z, and $\bar{Q}$. Here $\bar{X}$ represents the binary complement of X and is taken from the lower end of secondary winding 153 of output transformer 152 of flip-flop 55. $\bar{Q}$ is taken from the complementary output terminal of the controlled flip-flop 10 and, like signal Q applied to gating circuit 90, represents a steering signal. The cathodes of diode 101, 102, and 103 are connected in common to a resistor 104 the opposite end of which is connected to B—. The output lead of gate 100 is labelled 105.

Gating circuit 110 includes diodes 111, 112, and 113, respectively receiving at their anodes signals $\bar{Y}$, $\bar{Z}$, and $\bar{Q}$. A pull-down resistor 114 is connected between B— and the cathodes of the diodes, the output lead being labelled 115.

Gating circuit 130 includes a diode 131 having its cathode connected to output lead 105 of gating circuit 100, and a diode 132 having its cathode connected to output lead 115 of gating circuit 110. The anodes of diodes 131 and 132 are tied together to form an output lead 135 which is connected to the K input lead of the controlled flip-flop.

Although only three gating levels or stages are illustrated in Fig. 4, it has been found in actual practice that as many as ten gating levels can be successfully controlled by means of voltage-couple input signals having only a two-volt swing, that is, from +1 volt to −1 volt. Although in gating circuit 120 the diodes 122 and 123 are not shown as being in actual use, diode 121 is nevertheless required. One reason for this is that it is necessary to isolate the gating matrix from the flip-flop 10 during the time when the delayed clock pulse $CP_{\frac{1}{2}}$ is applied to the transistor bases. Furthermore, output lead 95 of gating circuit 90 is generally at a higher potential than the J input terminal of the flip-flop, and must be so maintained except during the times when a clock pulse passed by gating circuits 80 and 90 establishes the voltage level on output lead 95 at −3 volts. Diode 121 therefore provides this function by means of its high impedance to inverse current.

In Fig. 4 both the J and K inputs are shown as being selectively controlled by means of gating matrices. This is the general case, rather than the type of operation illustrated in Fig. 1 wherein only the J input is controlled by a gating matrix. It is of course possible to tie both the J and K inputs together and control them by means of a single matrix, as will be apparent to those skilled in the art.

The operation of the steering signals will now be explained. As previously mentioned, selective control of the J and K inputs provides eight different possible responses of the flip-flop. Two of these responses correspond to cases where both the J and K inputs are simultaneously pulsed or triggered. This type of operation may be undesirable since one of the pulses will be effective to turn off one of the transistors, and the other pulse is supposed to have no effect upon the circuit, but may in fact slow down the regenerative action or even cause the triggering response to be unreliable. It then becomes desirable to feed back from the output of the flip-flop 10 to the input, a signal which will preclude the application of that pulse which is supposed to have no effect. The use of such feedback or steering circuits is sometimes based solely upon engineering considerations in order to improve the reliability of the circuit response. In other instances it may be employed as a part of the logical circuit design where it is desired to have the new state of the flip-flop be a mathematical function of its own previous state, as well as of other input signals applied to the controlling gating matrices.

As previously stated, the J input is defined as the input at which a received pulse will be operative, when the primary output signal Q is low, for triggering the circuit to the condition where signal Q is high. Thus if signal Q is already at its higher level a pulse applied to the J input terminal is supposed to be ineffective. Accordingly, in the gating matrixes 80, 90, 120 controlling the J input lead the purpose of the steering signal must be to inhibit the application of a pulse to the J input lead except when output signal Q is at its low level. It will be seen that this is accomplished by gating circuit 90. Gating circuit 90, having the same type of operation as gating circuits 50 and 60 in Fig. 1, passes a clock pulse $CP_1$ at the −3 volt level only when all of the signals applied to its diodes are at their lower level during the latter portion of the time interval. Thus, the application of signal Q to diode 91 in gating circuit 90 inhibits the occurrence of a pulse at the J input when signal Q has a high level, namely, in situations corresponding to time intervals *d* and *g* shown in Fig. 2.

The application of signal $\bar{Q}$ to gating circuits 100 and 110 has a similar effect, inhibiting the application of a pulse to the K input when $\bar{Q}$ is high under conditions corresponding to time intervals *b* and *e* of Fig. 2. It is necessary to apply the feedback signal to both of gating circuits 100 and 110, as otherwise a clock pulse could be passed to gating circuit 130 and thence to the K input.

Selecting the binary convention according to rule 3 of Table I, gating circuits 80, 120, and 130 become "and" circuits, and gating circuits 90, 100, and 110 become "or" circuits.

In both Figs. 1 and 4 the combination of gating circuits shown has been selected primarily to illustrate the engineering applicability of this type of gating circuit structure.

It may be shown, however, that flip-flop 10 generates the function $$Q_n=(A+B).(C+D).\bar{Q}_{n-1}$$

for the circuit of Fig. 1, and $$Q_n=\bar{Q}_{n-1}.(W.X+Y)+Q_{n-1}.(X.\bar{Y}+X.\bar{Z}+\bar{Y}.\bar{Z})$$

For the circuit of Fig. 4, where the binary convention has been selected in accordance with Rule 3 of Table I and the various symbols are as previously defined.

While it will be understood that the circuit specifications may vary according to the design of any particular application, the following circuit specifications are included by way of example only.

With reference to the circuit of Fig. 1:

In flip-flop 10:

| | |
|---|---|
| Transistors **20** and **30** | N–P–N junction transistor type 2N99. |
| Diodes **27**, **37**, **28**, **38** | 1N67A germanium rectifier. |
| Capacitors **26**, **36** | 0.0047 μf. |
| Capacitors **25**, **35** | 39 μμf. |
| Resistors **24**, **34** | 68,000 ohms. |
| Resistors **29**, **39** | 1,000 ohms. |
| Resistor **40** | 20,000 ohms. |
| Primary winding of transformer **41** | Total inductance of 80 mh., 40 mh. on each side of center tap. |
| B+ potential | +15 volts. |
| $-B_1$ potential | −1.5 volts. |

In clock-pulse generator 11:

Period is 6 microseconds from each pulse $CP_1$ to next pulse $CP_1$.

Pulses $CP_{\frac{1}{2}}$ spaced midway between pulses $CP_1$, or 3 microseconds.

| | |
|---|---|
| Reference voltage level | 0 volts. |
| Pulse amplitude | −2 volts. |
| Pulse duration | 1 microsecond. |

In the gating matrix:

| | |
|---|---|
| All diodes | 1N67A germanium rectifier. |
| Resistors **53**, **63** | 20,000 ohms. |
| B− potential | −22.5 volts. |

In the driving flip-flops 14–17:

| | |
|---|---|
| Output impedance from center tap to one one end of each secondary winding such as **141** | 1 ohm. |
| Open circuit inductance of each secondary winding such as **141** | 0.1 mh. |
| Leakage inductance of each secondary winding such as **141**, approx. | 1 μh. |

In the gating matrix of Fig. 4:

| | |
|---|---|
| B+ potential | +22.5 volts. |
| Resistor **83** | 13,000 ohms. |

A description of the novel circuitry provided by the present invention would not be complete without a brief mention of some of the engineering problems associated therewith, and a solution to these problems. Three such problems which will be discussed are the presence of time delays caused by the circuits; selection of design parameters for the gating circuits; and adjusting the trigger sensitivity.

As pointed out in the aforementioned copending application for "Transistor Multivibrator," the use of transistors in driver stage 42 of flip-flop 10 results in appreciable time delay. Further, there is a measurable time delay in the triggering response of the astable circuit 10 shown in Fig. 1 of this application. The result is that the output signals from each flip-flop are delayed with respect to its input signals. This does not, however, mean any loss in the synchronization of an entire system. It simply means that the primary clock pulse may be combined with the output waveforms of a flip-flop so as to occur not at the end portion of the second half of the waveform, but during the early or middle portion of the second half of the waveform. There is no objection to this as long as the second half of the waveform has reliably established its voltage level prior to the occurrence of the clock pulse. In actual operation it has been found that a delay in the flip-flop amounting to one-fourth of a time interval, or one-half the distance in time between a delayed clock pulse $CP_2$ and the next primary clock pulse $CP_1$, is perfectly permissible. For the circuit of flip-flop 10 shown in Fig. 1, and for which satisfactory values of circuit constants are listed above, the time delay was found to be not more than 1½ microseconds. By selecting the time interval between each occurrence of the primary clock pulse $CP_1$ as 6 microseconds, the time delay occurring within the flip-flop resulted in no engineering difficulties. It should be pointed out in this connection, that the voltage waveforms in Figs. 2 and 3 are idealized to the extent of showing no time delay occurring between the input and output signals of the flip-flop.

The selection of design parameters in the gating circuit is based initially upon the requirement that the output signal from a gating matrix must be sufficient for triggering a flip-flop. With reference to Fig. 1, the described design of flip-flop 10 has been found to provide an initial maximum current of approximately 240 microamperes flowing into base 23 of transistor 20, the amount of current decreasing as the circuit approaches its self-triggering point. Voltage B— and the resistor values are selected to provide a constant current of 1 milliampere flowing through each of resistors 53, 63. Upon the occurrence of a trigger pulse, a portion of this constant 1 milliampere current immediately is supplied from capacitor 26 in the flip-flop, the remaining portion continuing to be supplied from diodes 51, 52 or 61, 62. The values of B— and the resistors 53, 63 are selected so that the expected voltage change occurring on lead 55 or 65 will not vary the 1 milliampere constant current by an appreciable amount. In designing the gating circuit, the value of each first pull down resistor (nearest flip-flop 10) such as 53 or 63 has been selected as 20,000 ohms, as shown in the above list of circuit values. The value of the first pull-up resistor (nearest flip-flop 10) such as resistor 83 in Fig. 4 has been selected as 13,000 ohms. When more gating levels or stages are used, the values of the second and third pull-down resistors may be 9,100 ohms and 4,300 ohms, respectively, while the values of the second and third pull-up resistors may be 6,200 ohms and 3,900 ohms, respectively.

It is evident that any astable circuit, such as flip-flop 10 of Fig. 1, requires less energy for triggering than does a corresponding bistable circuit of the traditional Eccles-Jordan type. The reason for this appears to be that since the circuit will, if permitted, trigger itself, it becomes progressively more sensitive to an input trigger pulse as the self-triggering point is approached. While this also means that the circuit could easily become over-sensitive to trigger pulses, resulting in false triggering, it has been found in actual practice that by selecting the natural period of stability of the circuit to be an appropriate amount greater than the clock-pulse period this tendency toward instability can be overcome. For example, with a primary clock pulse period of 6 microseconds the circuit constants may be selected to provide a normal stability period in either state of approximately 10 microseconds. Thus the amount of energy which must be supplied for triggering the circuit is substantially reduced as compared to conventional bistable circuits.

The decreased triggering energy required by the flip-flop circuit of the present invention will be apparent by reference to the type of transistor flip-flop circuit described in an article entitled "Transistor Circuitry for Digital Computers," by C. L. Wanlass, in IRE Transactions on Electronic Computers, March 1955, at pages 11–16, and particularly Fig. 3 thereof on page 13. In the Wanlass circuit shown in Fig. 3 each transistor base is coupled to ground through a biasing resistor $R_3$. It is apparent that in order to trigger the conducting transistor to the non-conducting state, it is not only necessary to interrupt the flow of current between the base and emitter of that transistor, but it is also necessary to divert a substantial amount of current flowing through the biasing resistor between base and ground. In contrast, the flip-flop circuit of the present invention has no bias resistor, hence it is only necessary to interrupt the current flowing through the transistor itself.

Summarizing the advantages provided by the present invention, the greatly increased power efficiency of the circuits results in correspondingly reduced power dissipation, and permits much closer physical spacing of the circuit components. The small voltages utilized in the gating circuits make a high peak inverse voltage characteristic of the diodes unnecessary so long as their forward conductivity is high. Considerable variations in supply voltages and in component values may be tolerated without affecting the reliability of the circuit response. A further advantage is that the use of several gating levels or stages permits a reduction in the total number of gating diodes required to perform a given logical function.

What is claimed as new is:

1. A logical decision network comprising a plurality of bistable elements each including an output transformer having a secondary winding, said bistable elements energizing said transformers to produce across the ends of said secondary windings, respectively, a plurality of binary-coded dynamic signals, each of said voltage-couple signals having during successive time intervals either a high level during the early portion of the time interval and a low level during the later portion thereof, or vice versa; means coupled to each of said secondary windings for applying a voltage pulse thereto in combination with said binary-coded signals therein once during each time interval; a gating matrix including a number of unilaterally conductive electrical elements, said matrix having a plurality of input terminals, each being connected to a separate one of said transformer windings, said gating matrix having an output terminal for producing an output signal representing a logical function of said binary-coded signals applied to said plurality of input terminals; a flip-flop circuit including a pair of cross-coupled transistors, each having an emitter, a collector, means for coupling said output terminal to one of said bases and a base; and an additional unilaterally conductive element serially connected between said output terminal of said gating matrix and to the other one of said bases for selectively switching current flowing into said one base in response to said output signal.

2. In combination, a plurality of flip-flops, each including an output transformer for producing binary-coded dynamic information signals during successive time intervals, each of said output transformers having a secondary winding with two ends and an intermediate tap; means connected to each of said taps for applying a voltage pulse thereto in combination with said information signals during each time interval; a gating matrix including a plurality of input terminals, each being connected to a separate one of said secondary winding ends, said gating matrix having an output terminal for producing an output signal representing a logical function of the information signals applied to said plurality of input terminals; a flip-flop circuit including a pair of cross-coupled transistors, each having an emitter, a collector, and a base, said flip-flop having two stable states, each corresponding to conduction by one transistor and non-conduction by the other, and including a network supplying a constant current to the base of the conducting transistor; means for coupling said output terminal to one of said bases and a unilaterally conductive element serially connected between said output terminal and to the other one of said bases for selectively turning off the associated transistor by by-passing said constant current in response to coincidence of said voltage pulse and a predetermined value of said output signal.

3. A logical decision network comprising: a first gating matrix including at least two gating levels, and having at least two unilaterally conductive electrical elements for each gating level, said matrix having a plurality of input terminals and an output terminal; circuit means including a plurality of output transformers for applying a plurality of binary-coded dynamic signals to said input terminals, respectively, each signal having during successive time intervals either a high level during the early portion of the time interval and a low level during the later portion thereof, or vice versa; means for additionally applying to each of said input terminals through said output transformers a read-out pulse in combination with said binary-coded signals once during each time interval, whereby said output terminal produces an output signal corresponding to the algebraic summation of said read-out pulse and a binary-coded signal representing a logical function of the signals applied to said input terminals; a flip-flop circuit including a pair of cross-coupled junction transistors, each having an emitter, a collector, means for coupling said output terminal to one of said bases and a base; and an additional unilaterally conductive element serially connected between said output terminal and to the other one of said bases for selectively switching current normally flowing into said one base in response to said output signal.

4. The logical decision network claimed in claim 3 which further includes a second gating matrix including at least two gating levels, and having at least two unilaterally conductive electrical elements for each gating level, said matrix having a plurality of input terminals and having a second output terminal; a further unilaterally conductive element serially connected between said second output terminal and the other of said bases for selectively switching current normally flowing into said other base; means coupled to said flip-flop for producing primary and complementary output signals representing the state of said flip-flop; and steering circuit means for applying said primary output signal to one of said gating matrices and for applying said complementary output signal to the other of said gating matrices.

References Cited in the file of this patent

UNITED STATES PATENTS

| | | |
|---|---|---|
| 2,622,212 | Anderson et al. | Dec. 16, 1952 |
| 2,644,887 | Wolfe | July 7, 1953 |
| 2,673,936 | Harris | Mar. 30, 1954 |
| 2,706,811 | Steele | Apr. 19, 1955 |
| 2,712,065 | Elbourne et al. | June 28, 1955 |
| 2,759,104 | Skellett | Aug. 14, 1956 |

UNITED STATES PATENT OFFICE

CERTIFICATE OF CORRECTION

Patent No. 2,903,606 September 8, 1959

Daniel L. Curtis

It is hereby certified that error appears in the printed specification of the above numbered patent requiring correction and that the said Letters Patent should read as corrected below.

Column 14, lines 55 and 56, strike out "means for coupling said output terminal to one of said bases" and insert the same in line 56, after "base;", same column; column 15, line 32, after "a collector," strike out "means"; column 16, line 1, strike out "for coupling said output terminal to one of said bases"; line 2, after "base;" insert -- means for coupling said output terminal to one of said bases --.

Signed and sealed this 26th day of April 1960.

(SEAL)
ttest:

KARL H. AXLINE
ttesting Officer

ROBERT C. WATSON
Commissioner of Patents